United States Patent

[11] 3,592,360

[72] Inventor Benjamin J. Aleck
Jackson Heights, N.J.
[21] Appl. No. 649,704
[22] Filed June 28, 1967
[45] Patented July 13, 1971
[73] Assignee Arde, Inc.
Paramus, N.J.

[54] CYLINDRICAL FLUID STORAGE AND EXPULSION TANK
12 Claims, 8 Drawing Figs.

[52] U.S. Cl.................................................. 222/95,
222/107
[51] Int. Cl.................................................. B65d 35/28
[50] Field of Search............................................. 222/105,
95, 386.5, 107; 220/85 B

[56] References Cited
UNITED STATES PATENTS

| | | | |
|---|---|---|---|
| 2,924,359 | 2/1960 | Beremand | 222/386.5 |
| 3,158,296 | 11/1964 | Cornelius | 222/386.5 |
| 3,197,087 | 7/1965 | Black | 222/386.5 |
| 3,213,913 | 10/1965 | Petriello | 222/95 X |

*Primary Examiner*—Samuel W. Engle
*Attorney*—Hubbell, Cohen and Stiefel

ABSTRACT: Means for preventing the radial collapse of a cylindrical portion of an expulsion bladder is secured to the bladder in such a way that the bladder can not be separated from the reinforcement in a normal direction by the application of actuation pressure but can be peeled away from the reinforcement by forces resulting from the actuation pressure.

PATENTED JUL13 1971

INVENTOR
BENJAMIN J. ALECK
BY
Hubbell Cohen & Senfel
ATTORNEYS.

PATENTED JUL 13 1971
3,592,360
SHEET 2 OF 2
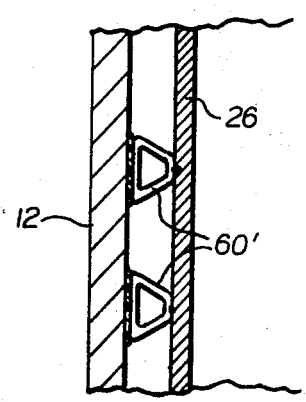
FIG. 7.
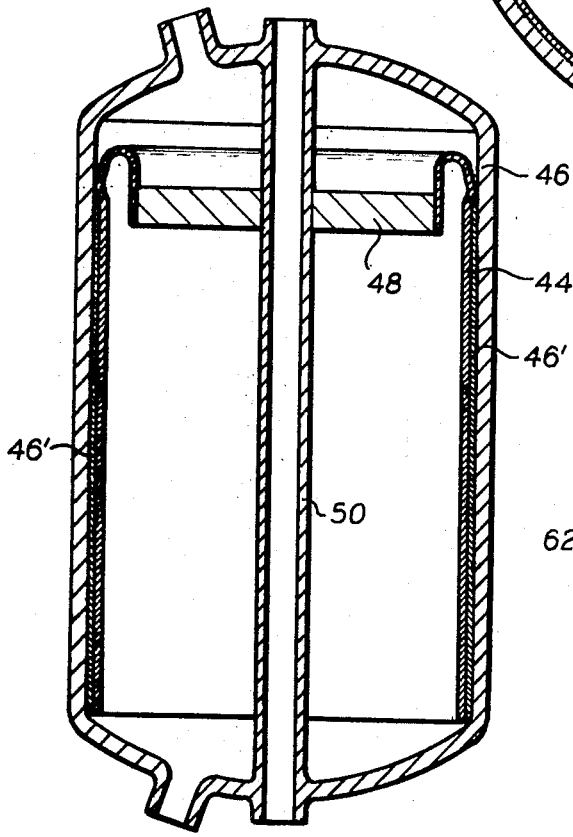
FIG. 4.
FIG. 5.
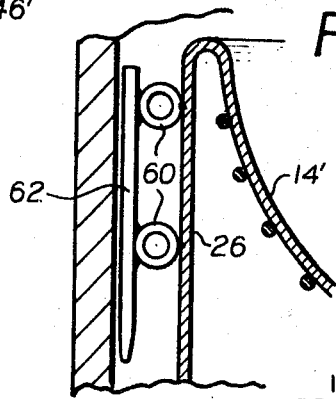
FIG. 6.
INVENTOR
BENJAMIN J. ALECK
BY
ATTORNEYS.

CYLINDRICAL FLUID STORAGE AND EXPULSION TANK

DESCRIPTION OF THE PRIOR ART

The closest known prior art to the present invention is the provision of a fluid storage and expulsion bladder of cylindrical configuration which is disposed within a surrounding pressure vessel and has provided in the annular space therebetween a rubbery sealant which prevents the expulsion pressure from being applied to the bladder in a radial direction to thereby prevent the radial collapse of the bladder. The bladder may be peeled from the sealant during controlled longitudinal collapse to thereby expel the fluid stored therewithin. Such a system has enjoyed only limited success primarily because of the difficulty of having the sealant provide a good pressuretight seal to prevent radial pressure from being applied to the bladder which radial pressure, as already stated, will result in radial collapse of the bladder. In addition, there is no way of inspecting the assembly once assembled to be certain that the rubbery sealant is properly cured so as to determine that the sealant will provide a peelably bond with the bladder.

BRIEF DESCRIPTION OF THE DRAWINGS

FIG. 4 is a view similar to FIG. 1 showing a modified embodiment of the present invention;

FIG. 5 is a vertical sectional view of still another modified form of the present invention;

FIG. 6 is a fragmentary vertical sectional view of still another modification of the present invention;

FIG. 7 is a view similar to FIG. 6 showing still another modification; and

DETAILED DESCRIPTION OF THE PREFERRED EMBODIMENTS

Figure 1:
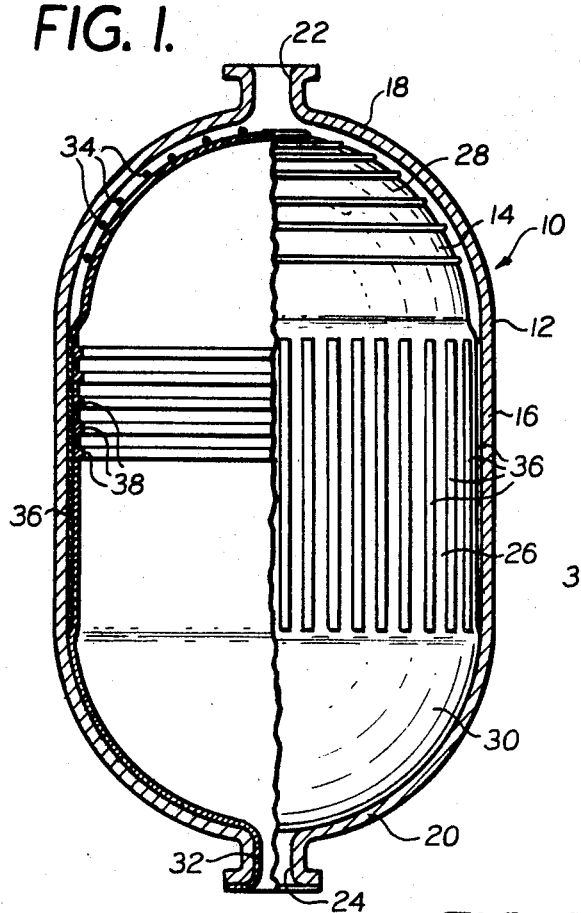
FIG. 1 is a vertical sectional view of a fluid storage and expulsion tank embodying the present invention.
Figure 3:
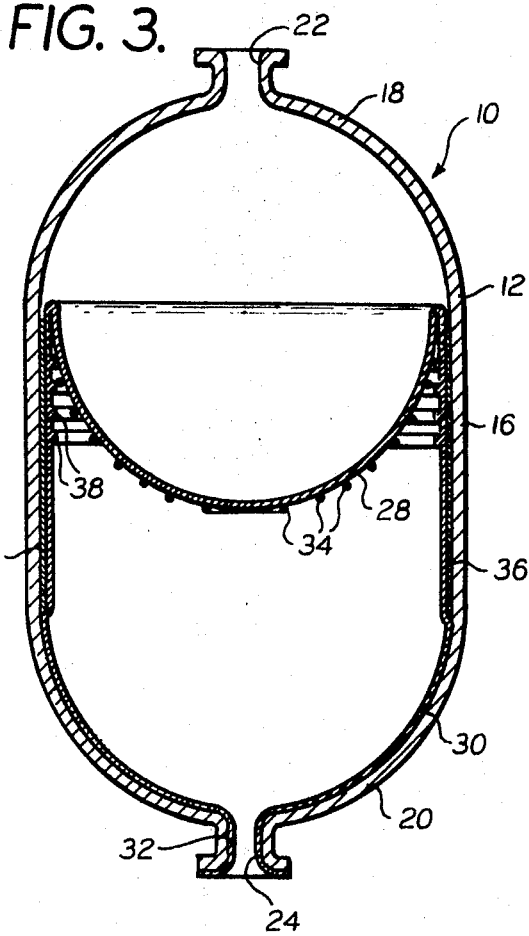
FIG. 3 is a view similar to FIG. 1 showing the bladder in a partially collapsed condition.
Figure 2:
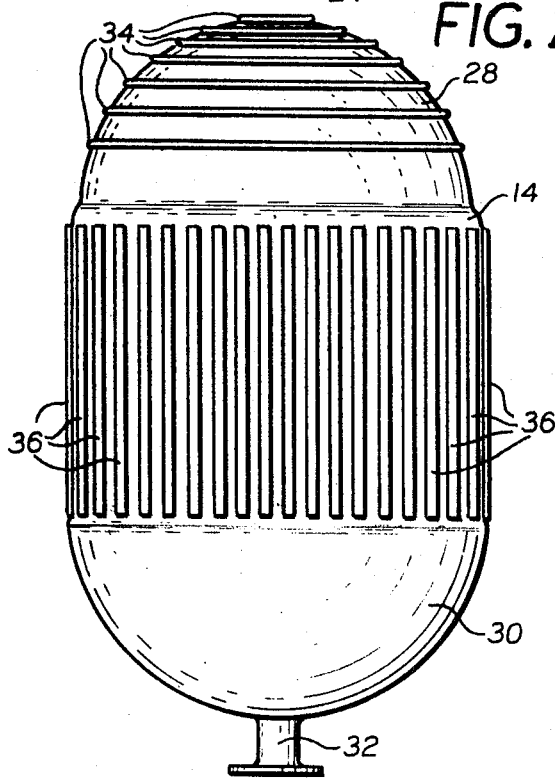
FIG. 2 is a side elevational view of the expulsion bladder employed in FIG. 1.

Referring now to the drawings in detail and particularly to FIGS. 1 to 3 thereof, the cylindrical fluid storage and expulsion tank 10 includes a pressure vessel 12 and an expulsion bladder 14. The pressure vessel 12 of FIGS. 1 and 3 is provided with a cylindrical center section 16 and two hemispherical heads 18 and 20. The hemispherical head 18 is provided with a pressure inlet 22 and the hemispherical head 20 is provided with a fluid outlet 24. The pressure vessel may be formed of any suitable material depending upon its intended use, and in many space applications high strength material such as series 300 Stainless Steels, maraging steels, cryogenically stretch formed steels are desirable for the formation of the vessel 12.

The metallic bladder 14 is shaped substantially complimentary to the interior of the vessel 12. That is, the bladder 14 has a cylindrical center section 26, a hemispherical head end 28 and a hemispherical head end 30, the latter having a fluid inlet and outlet 32 that is registerable and connectable with the outlet 24 in the vessel 12. The bladder is preferably made of highly yieldable metal such as austenitic stainless steel or the like. As is well known to those skilled in the art of fluid storage and expulsion systems of this type, fluid which has been disposed within the interior of the bladder 14 through the inlet 32 may be expelled therefrom by applying pressure to the exterior of the bladder through the vessel inlet 22. When such pressure is applied the bladder will collapse and squeeze or force the fluid within the bladder 14 out through the aligned inlets 32—24 for whatever intents and purpose the fluid may serve.

The manner of collapse of the bladder 14 is critical. If there is a disorderly collapse, for example in a radial direction, tears and holes can appear in the bladder which will cause a failure of the expulsion cycle. Thus an orderly mode of collapse is necessary and desirable for accomplishing the intended purpose of the invention. In the present invention, which relates to a cylindrical bladder, the intended mode of collapse is in an axial direction from the head end 28 of the bladder 14 towards the head end 30, with the head end 28 first inverting in on itself and the inversion progressing from the area of the inlet 22 of the vessel 12 toward the outlet 24 of vessel 12 in an orderly fashion. As the collapse proceeds in this orderly manner, fluid will be progressively expelled from the interior of the bladder 14. The present invention is directed to means for insuring the orderly collapse as just described.

In a bladder and vessel arrangement as shown in FIGS. 1 to 3 wherein the head ends are hemispherical, it is desirable to employ the invention described and claimed in U.S. Pat. Application Ser. No. 437,458 filed by Sidney S. Wayne and Benjamin J. Aleck on Mar. 5, 1965, now U.S. Pat. No. 3,339,803 for Fluid Storage and Expulsion System, which application is assigned to the assignee hereof, and which invention is designed to insure an orderly mode of collapse in a hemispherical bladder by the provision of a suitable reinforcing means in the form of circumferentially extending rings or corrugations which insure an orderly collapse first in the polar region and then progressively toward the diametrical plane thereof. This is achieved by the reinforcing 34 rendering the hemispherical head end 28 of bladder 14 more resistant to uncontrolled buckling than to flexural yielding. A detailed description of the hemispherical ends and the means for achieving such a mode of collapse is deemed unnecessary as reference may be had to said aforementioned Wayne and Aleck application. Suffice it to say in the illustrated embodiment of plurality of reinforcing rings 34 are secured to the hemispherical end 28 of bladder 14 to insure an orderly mode of collapse as described.

In accordance with the present invention, means are provided for insuring the orderly mode of collapse of the cylindrical portion 26 of the bladder 14. As best shown in FIG. 2, this means comprises a multiplicity of longitudinally extending reinforcing strips 36 which are secured to the outer periphery of the cylindrical portion 26 in closely spaced-apart relation therearound in such a manner that the physical connection or bond between the reinforcing strips 36 and the cylindrical portion 26 of bladder 14 is resistant to a pulling apart in a normal direction but does not afford great resistance to peeling of the bladder 14 from the reinforcing strips 36. Such a connection can be effected in a number of ways. For example, and as presently preferred, if the strips are made of the same material as the expulsion bladder 14, they may be seam welded to the exterior of the bladder which seam weld will afford the connection between the buffer strip and the expulsion bladder as is desired and as has already been described; namely, that the weld will be resistant to a pulling apart in a normal direction between the bladder material and the buffer strips from normal forces exerted by the actuation pressure need to effect collapse but will not be sufficient to resist the peeling of the bladder from the buffer strips. In the alternative, a multiplicity of spot welds can be employed to secure the buffer strips to the external periphery of the cylindrical portion 26 of bladder 14 and such spot welds can be readily controlled to yield the same type of connection as is desired and as has been described. Another alternative is to secure the strips 36 by, for example an adhesive, in which case there is no requirement that the buffer strips 36 be constructed of the same material as the bladder 14. The only requirement as to materials is that both are compatible with the adhesive employed and will yield with such an adhesive the type of connection heretofore described.

The purpose of the strips 36 is to prevent radial collapse of the cylindrical portion 26 of the bladder 14. This end is achieved by making the strips 36 sufficiently still to resist the bending forces resulting from the application of actuation pressure within the vessel. This result can also be achieved by securing the buffer strips 36 to the internal surface of the pressure vessel 12 so that the cylindrical portion 26 of the bladder 14 is secured to the vessel 12 through the strips 36 and is prevented from radial collapse by the vessel itself. If the strips 36 are secured to the vessel wall so that the vessel itself provides a portion at least of the resistance to radial collapse of the bladder, it will be obvious that the manner of securement of the strips 36 to the vessel wall must be sufficiently strong to prevent the pulling away of the strips 36 from the vessel wall during the application of actuation pressure to effect collapse of the bladder.

In operation, upon completion of the controlled mode of collapse of the hemispherical end 28 of the bladder 14, there will be stress concentrations between the strips 36 and the ring of bladder 14 at the boundary between that portion of the bladder which has not collapsed and that portion of the bladder which has collapsed which stress concentrations will act to peel the bladder in a progressive manner away from the strips 36 so as to cause an orderly and progressive collapse in the manner best illustrated in FIG. 3. So long as actuation pressure is supplied to the interior of the vessel 12 through the inlet 22 the bladder 14 will continue its orderly mode of collapse in the manner best illustrated by FIG. 3 until one half of it has collapsed into the other half whereupon there would have been a complete expulsion of fluid from the bladder.

In order to prevent the possibility of a disorganized collapse of the bladder 14 and especially the cylindrical portion 26 thereof stemming from the unequal adhesion of the bladder to the strips 36 or the unequal resistance of different portions of the bladder to inversion during collapse, either of which will cause a canting of the bladder which will ultimately result in a disorderly collapse and possible tearing or forming of pinholes or the like, the interior of the bladder 14 is preferably provided with a multiplicity of spaced-apart circumferentially extending rings 38 which are secured to the interior of the bladder as by brazing or soldering although, if desired, they can be formed integrally with the bladder as by etching or the like. With the provision of such rings 38, if there is a disorderly collapse or canting of the bladder portion 28 during expulsion of fluid, the portion that is less resistant to collapse will advance in its collapse only up to the nest ring 38. Each of the rings 38 provides a boundary of resistance to collapse which resistance should be greater than any afforded by unequal adhesion or unequal collapse qualities of the bladder itself. Thus at the point where the less resistant portion of the bladder collapses to a ring 38, the collapse in that zone will be retarded until the remainder of the bladder advances to that ring at which point the bladder together with the secured ring 38 will invert upon itself in the standard mode of collapse and advance to the next ring.

Referring now to FIG. 4, another means of preventing canting of the bladder during collapse especially of the cylindrical portion 26 thereof is illustrated. In the embodiment of FIG. 4, the bladder 14' is essentially annular in cross-sectional configuration rather than circular, with a tube or pipe 40 running down through a central passage 42 in the bladder 14'. The provision of the central pipe or tube 40 in the passage 42 of the bladder 14' assures that the bladder 14' will not cant unduly during collapse as such canting is prevented positively by the presence of the tube 40 itself. Accordingly, there is no need for the bladder 14– to be provided with circumferentially extending stiffener rings 38 as the bladder 14 is provided.

It should be understood that the tube or pipe 40 can serve more than merely the function of preventing canting of the bladder 14' during collapse. For example, the pipe or tube 40 can serve as a conduit for fluid being expelled from some other pressure vessel or merely for carrying some fluid from one end to the other and must be passed, for reasons of geometry of the vehicle in which the entire system is disposed, through the center of the pressure vessel 12'. However, this provides no inconvenience in the arrangement described. It will of course be realized that if the pipe 40 does not serve as a fluid conduit, it may nevertheless be included as shown in FIG. 4 solely for the purpose of preventing canting of the bladder 14' during collapse.

Turning our attention now to FIG. 5, there is shown therein a modified form of bladder 44 in a cylindrical pressure vessel 46 which bladder 44 is not provided with hemispherical ends such as the ends 28 and 30 of FIG. 2. That is to say, the bladder 44 is substantially solely cylindrical in configuration. With such a shape of bladder, it is well known to use a heavy piston-type head end 48 which is secured to the bladder 44, preferably of annular configuration and surrounding a central tube 50 that is substantially the same as the tube 40 of FIG. 4. The exterior periphery of the bladder 44 will be provided with strips 46' that are substantially identical to the strips 36 of FIG. 2 which reinforcing strips may be connected to the bladder wall 44 and to the interior vessel wall in precisely the same manner or manners described heretofore to operate substantially the same way. Thus the invention will serve to insure an orderly mode of collapse of the bladder 44 through its entire length, which length is substantially entirely cylindrical, in substantially the same way as the strips 36 insured an orderly mode of collapse of the cylindrical portion 26 of the bladder 14 of FIGS. 1 to 3.

Suffice it to say, in lieu of a vessel of the type shown in FIG. 5 wherein a central tube 50 passes through the bladder 44 along the central axis thereof, the central tube 50 could be eliminated and circumferentially extending spaced-apart stiffener rings 38 could be substituted therefor which rings would function in the same manner and for the same reasons as the rings 38 in FIGS. 1 to 3.

Figure 8:
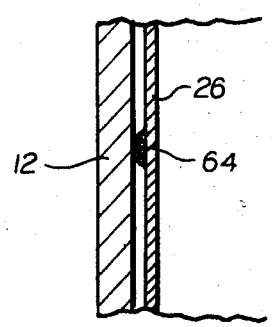
FIG. 8 is a view similar to FIGS. 6 and 7 showing still a further modification.

There are other means of preventing radial collapse of the cylindrical portion of an expulsion bladder of the type heretofore described. That is to say, means may be employed for preventing such disorderly collapse other than the longitudinal reinforcing strips 36 heretofore described. Such alternate means are shown in FIGS. 6, 7 and 8.

Referring now to FIG. 6, the cylindrical portion 26 of a bladder 14' may be provided with a plurality of hoop stiffeners 60 which are spaced-apart in an axial direction. The rings 60 are proportioned to resist radial collapse during the application of actuation pressure and are secured to the exterior wall of the cylindrical bladder portion 26 in any suitable manner as by seam welding, spot welding, brazing or adhesives in such a manner as to prevent the pulling in a normal direction of the bladder off of the ring (as would occur in a radial collapse of the bladder) and yet to permit the peeling off of the bladder from the stiffening ring 60 as the bladder tends to roll in on itself during orderly collapse and the ring resists such rolling action. Accordingly, as the bladder 14' is subjected to actuation pressure to cause it to collapse in the previously described mode, the cylindrical portion 26 thereof will collapse in a progressive and orderly fashion from ring 60 to ring 60 and at each ring, as collapse occurs, the bladder will peel off of the ring. The remaining rings, which will be subjected solely to a normal force by the actuation pressure will remain adhered to the cylindrical portion 26 of bladder 14' due to the fact that the manner of securement is such as to prevent separation in the normal direction. Thus the stiffening rings 60 not disposed at the line of collapse will serve to prevent the radial collapse of the uncollapsed part of cylindrical bladder portion 26.

In order to prevent each of the stiffener rings 60 from becoming a completely unattached object within the pressure vessel 12 after separation from the bladder 14' as just described, it is desirable to provide a plurality of longitudinally extending securement rods 62 which are connected to the stiffener rings 60 so that after separation of the bladder from the stiffener ring the stiffener ring will be held in its illustrated position by the rods 62 to thereby yield ultimately a skeletal structure of stiffener rings 60 and longitudinal securement rods 62. With such a structure there is no need of securing the longitudinal securement rods 62 to the vessel wall although, if desired, this may be done. It will be understood, as already indicated, that the inclusion of the securement rod 62 is optional although desirable. Suffice it to say, if securement rods 62 are employed, they should be connected to stiffener rings 60 with sufficient strength to prevent a separation therebetween as a result of forces resulting from the application of actuation pressure.

Referring now to FIG. 7 a still further modification of the present invention is shown. In the modification of FIG. 7 radial collapse of the cylindrical bladder portion 26 may be prevented in one of two ways. In accordance with one manner of preventing radial collapse, stiffener rings 60' are secured to the cylindrical bladder portion 26 in such a manner as to prevent a pulling apart between the rings 60' and the bladder portion 26 in a normal direction but to permit a peeling of the bladder portion 26 from the rings 60' during the described orderly mode of collapse. With such being the case, the rings 60' themselves prevent the radial collapse of the bladder portion 26 by virtue of their own stiffness. In such an embodiment, the rings 60' are preferably secured to the vessel wall 12 in any suitable manner so that the rings are not free to move around after disconnection from the bladder portion 26. In such case, the vessel serves the same function as securement rods 62 of FIG. 6.

In an alternative form of the invention shown in FIG. 7, the rings 60' do not provide the sole means for preventing radial collapse of the bladder portion 26. Rather, the rings 60' are so connected to the vessel wall 12 that the vessel wall itself provides resistance to radial collapse of the bladder 26 through the rings 60'. Thus, the connection between rings 60' and the vessel wall must be sufficiently strong to resist the radial forces resulting from the application of actuation pressure. In either event, the manner of securing the rings 60' to the cylindrical bladder portion 26 is such as to prevent normal tearing off of the bladder portion 26 from the ring 60' but to permit a peeling thereof during normal collapse of the bladder.

Referring now to FIG. 8, a still further modification of the present invention is illustrated wherein no circumferentially extending stiffener rings are included for preventing in whole or in part the radial collapse of cylindrical portion 26 of bladder 14. In the embodiment of FIG. 8, the total resistance to radial collapse of bladder portion 26 is provided solely by the vessel 12 itself through securement of the bladder to the vessel wall 12 by use of adhesives or spot welding or the like. As is true of all of the other embodiments heretofore described, the securement, designated by the reference numeral 64, is of a type that will prevent a pulling away of the bladder portion 26 from the vessel 12 in a normal direction but which will permit the peeling of the bladder 26 therefrom during orderly collapse of the cylindrical portion 26.

At various portions of this description mention has been made of the use of adhesives to effect various types of securement. It has been found that polymeric adhesives of the type exhibiting a liquid A-stage, a mildly tacky B-stage and a securely bonding C-stage are desirable in these applications. It has been found that one convenient way of applying adhesive for the various reasons hereinbefore mentioned is to utilize a perforated polytetrafluoroethylene mask to overlie a surface on to which adhesive is to be applied, and then to apply the adhesive to said surface through the mask perforations, and then to B-stage the adhesive so employed. Thereafter the adhesive coated surface can be brought into confronting relation with a surface to which it is to be adhered and the adhesive can be C-staged to effect the bond.

It will be understood from the foregoing description that various means for resisting radial collapse of a longitudinally collapsible cylindrical expulsion bladder have been described and these means include strips 36, rings 60 or 60', and the wall 12 of the pressure vessel in which the bladder is to be disposed. Irrespective of the form of reinforcement, the bladder must be secured thereto in such a manner that it can not be pulled away from such reinforcement in a radial direction by forces resulting from actuation pressure necessary to effect an orderly longitudinal form of collapse. However, in order to prevent the securement from interfering with such orderly longitudinal collapse, the securement must be sufficiently weak in peel strength to permit the peeling of the bladder from the reinforcement during orderly collapse notwithstanding resistance of normal pulling away of the bladder from the reinforcement.

While I have herein shown and described the preferred form of the present invention and have suggested modifications thereof, other changes and modifications may be made therein within the scope of the appended claims without departing from the spirit and scope of this invention.

What I claim is:

1. In a fluid storage and expulsion system having a pressure vessel and a collapsible expulsion bladder therewithin, said pressure vessel having an inlet for the application of actuation pressure to effect the collapse of said expulsion bladder, said expulsion bladder having a cylindrical portion which is collapsible in a longitudinal direction and in a radial direction, said expulsion bladder further having an inlet-outlet for the introduction of fluid into said bladder and for the expulsion of fluid therefrom during collapse thereof, the improvement comprising:

reinforcing means for preventing radial collapse of said cylindrical bladder portion; and means for connecting said cylindrical bladder portion to said reinforcing means, said connecting means being sufficiently strong to resist separation of said bladder portion from said reinforcing means in a direction normal to said reinforcing means and bladder portion resulting from normal forces during the application of actuation pressure and insufficiently strong to resist peeling of said bladder portion from said reinforcing means during longitudinal collapse of said bladder portion.

2. The fluid storage and expulsion system of claim 1, wherein said reinforcing means comprises a plurality of longitudinally extending circumferentially spaced reinforcing strips.

3. The fluid storage and expulsion system of claim 1, further comprising means for preventing substantial unequal collapse of said cylindrical bladder portion in a longitudinal direction.

4. The fluid storage and expulsion system of claim 3, wherein said last-mentioned means comprises a plurality of longitudinally spaced-apart circumferential rings on the interior of said bladder portion.

5. The fluid storage and expulsion system of claim 3, wherein said bladder has a central tubular portion, and said means for preventing substantial unequal collapse comprises a rigid member extending through said tubular portion in close fitting relation therewith.

6. The fluid storage and expulsion system of claim 1, wherein said reinforcing means comprises a plurality of circumferentially extending reinforcing rings in surrounding relation with said cylindrical bladder portion.

7. The fluid storage and expulsion system of claim 6, further comprising a plurality of longitudinally extending circumferentially spaced securement members connected to said reinforcing rings.

8. The fluid storage and expulsion system of claim 6, further comprising means for connecting said reinforcing means to the interior of said pressure vessel.

9. The fluid storage and expulsion system of claim 1, wherein said reinforcing means is said pressure vessel.

10. The fluid storage and expulsion system of claim 1, wherein said bladder is metallic.

11. The fluid storage and expulsion system of claim 10, wherein said bladder further comprises a substantially hemispherical head end and means thereon for rendering said bladder head end more resistant to uncontrolled buckling than to flexural yielding.

12. The fluid storage and expulsion system of claim 1, said bladder further comprising a head end including a piston with a central aperture therein, and a longitudinally extending member extending through said vessel and said piston aperture in close fitting relation with the latter.